United States Patent [19]
Webb et al.

[11] Patent Number: 5,286,514
[45] Date of Patent: Feb. 15, 1994

[54] METHOD OF PREPARING LOW FAT MEAT PRODUCTS

[75] Inventors: Neil B. Webb; James P. Hadden; Ta Chung Wu, all of Raleigh, N.C.

[73] Assignee: Webb Technical Group, Inc., Raleigh, N.C.

[21] Appl. No.: 15,911

[22] Filed: Feb. 10, 1993

Related U.S. Application Data

[63] Continuation-in-part of Ser. No. 774,516, Oct. 8, 1991, abandoned.

[51] Int. Cl.$^5$ .............................................. A23L 1/317
[52] U.S. Cl. .................................... 426/646; 426/652
[58] Field of Search ........................ 426/641, 646, 652

[56] References Cited

U.S. PATENT DOCUMENTS

2,355,548  8/1944  Musher ................................ 426/646
4,818,557  4/1989  Conrad ........................... 426/646 X

OTHER PUBLICATIONS

Development of Low-Fat Beef Patties with Added Dietary Fibers, Webb Technical Group, Nov. 20, 1990.

*Primary Examiner*—Arthur L. Corbin
*Attorney, Agent, or Firm*—John G. Mills & Associates

[57] ABSTRACT

This invention is a process for producing low fat meat products comprising trimming the meat to no more than 11%, by weight, fat, cooling the meat to approximately 40 degrees Fahrenheit, comminuting the meat to approximately ⅜ inch particle size, mixing between 0.5 and 5.0%, by weight, oat bran and betwen 0.3 and 3.0%, by weight flavoring with the comminuted meat, and comminuting the resulting mixture to between 3/16 inch and ⅛ inch particle size to produce a low fat meat product that, when cooked, has the mouth-feel, texture, juiciness and tenderness of normal fat comminuted meat products.

12 Claims, No Drawings

METHOD OF PREPARING LOW FAT MEAT PRODUCTS

This is a continuation-in-part of patent application Ser. No. 774,516 filed Oct. 8, 1991 for Low Fat Meat Products and Method for Preparing the Same, now abandoned.

FIELD OF INVENTION

This invention relates to food products and more particularly to low fat meat products containing oat bran and oat fiber and the method of producing the same.

BACKGROUND OF INVENTION

In the past, removing of fat from foods has typically been associated with a loss of quality, especially in meat products, as it is difficult to maintain the desired flavor, texture and moisture in reduced or low fat formulations.

A variety of approaches exist for the replacement of fat in meat products including the use of hydrocolloids such as seaweed extracts (carrageenans, agar, alginates), fermentation gums (xanthan gum), cellulose gums (MCC, CMC, HPC, MC), plant seed gums (locust-/carob bean gums, guar gum), starches, and processed plant products (wheat bran, soy products, other brans, Oatrim (R), etc.).

Additionally, many of the reduced or low fat meat formulations have a "cardboard" taste associated with them that greatly reduces consumer acceptance of these products. Further there are often objectionable flavors in grain/meat products which are easily detectable and juiciness is lacking.

DISCUSSION OF PRIOR ART

The following references represent the closest prior art of which the inventors are aware:

U.S. Pat. No. 4,818,557 to Conrad describes a meat replacement product comprised of both gluten protein and bran. The present invention considers oat bran as a fat replacement, not a meat replacement.

In addition, oat is low in gluten protein compared to wheat and the gluten/bran ratio referred to in the Patent very well may be unachievable in oats, particularly if oat bran is used as the meat replacement. This reference also mentions that substantially all water soluble components are removed while the oat bran used in the present invention has no water added in the milling process but does contain a substantial quantity of water soluble components i.e. starch and soluble fiber.

The meat products called for by the reference contain 10 to 25% grain meat while the present invention is always less than 10% on a dry weight basis. This is a product which is significantly different from the fresh pork sausage of the present invention. In other words, fresh pork sausage is not a "smooth paste" but is rather coarse, the meat having been forced through holes of 3/16 inch diameter. Additionally, the products of the present invention are not generally cooked prior to the time they are purchased by the consumer.

U.S. Pat. No. 4,971,810 to Hoyda et al discloses methods of making fiber enriched yogurt and considers the addition of dietary fibers as a fortification of fiber from a nutritional standpoint and not from a functional view i.e. the physical properties of dietary fibers contributing to the finished product. The methods describe how to apply high levels of dietary fibers, including oat fiber, in the yogurt product.

The oat bran applied in the reduced fat meat products of the present invention is considered to be a texture enhancer to maintain good mouth-feel and juiciness in the cooked product which is comparable to a regular, high fat meat product. The oat fiber in the present invention also has good water-holding and fat retaining capacities. Further, the size of the added fibers affect the sensory qualities of the food products of the present invention. Thus, the shape and particle size of the oat bran and usually oat fiber used in the meat products differ from those used in yogurt formulations.

U.S. Pat. No. 4,868,002 to Scaglione et al discloses processing techniques and methods for preparing meat jerky products using fiber sources. The definition of fiber in this Patent is based on "fibrous structure", preferably those fibers that originate from animal tissue with striated muscle and some fibrous plant sources. Thus, the fiber as used in this reference has a different meaning as to the general term of "dietary fibers".

The plant sources suggested to be used in this Patent include farinaceous materials, gum and plant protein including oat gluten. The oat bran and usually oat fiber used in the present meat products are neither a farinaceous material nor a suitable source for oat gluten and thus do no possess the ability to serve as a structural component for the beef jerky. Furthermore, both oat bran and oat fiber are not in the inventor's list of general components for beef jerky.

Finally, U.S. Pat. No. 4,539,210 to O'Connell et al and U.S. Pat. No. 4,544,560 to O'Connell both emphasize processing techniques for making a structured meat product, not how to use oat bran and oat fiber to improve the texture of the product as the present invention does.

In both Patents, the inventors mention that fiber content may be altered by the addition of bran or other fiber but they do not specify oat bran or oat fiber. Thus, the addition of bran and/or fibers are for fiber fortification and not for enhancement of the physical properties of the product.

BRIEF DESCRIPTION OF INVENTION

After much research and study into the above mentioned problems, formulations and processes have been developed for producing low fat meat products utilizing lean meat with the addition of oat bran, and in some cases, oat fiber and water to produce a product that has a "mouth-feel" which is similar to fat and the texture, juiciness and tenderness of natural meat products such as ground beef and ground pork.

More specifically, after evaluating an exhaustive list of possible formulations, it has been determined that formulations utilizing oat bran and oat fiber provide products with superior characteristics. Oat bran has the ability to produce mouth-feel which is similar to fat, giving the oat formulations a distinct textural advantage, especially when the product has cooled. This prevents the "cardboard" taste associated with many of the other reduced and low fat meat formulations. Oat bran has also been found to impart no objectionable flavors to the product at the recommended usage levels and in the combination disclosed. This is a distinct advantage over most other grain products, many of which have easily detectable off flavors. The ability of oatbran to bind water at cool temperatures is also a distinct advantage in the present formulations, providing an economical product with good juiciness. Also the oat bran and oat fiber in the present formulation has the additional benefit of lowering dangerous cholesterol levels as recent research by Chicago's Rush-Presbyterian St-Luke's Medical Center has found.

It has been found that fibers high in soluble components, such as mucilage or gums show a high level of water holding capacity and those high in insoluble components, such as lignin have a high fat absorption capacity. The addition of oat bran at a level equal to or below 5.0% results in better cooking yield which means less weight loss and an increase in juiciness of cooked low fat meat products due to their water holding capacity. The addition of oat bran reduces toughness in the cooked low fat meat products but levels of oat bran above 5.0% result in a soft and mealy texture.

It has also been found that oat bran in large particle size, especially coarse ground oat bran, formulated in low fat meat products, provides a better texture. The addition of water at preferably a 3.0 to 10% level to the oat bran meat product results in an increase in juiciness and tenderness in the final cooked product.

The addition of oat fiber in the range of 0.5 to 3% provides improved texture and mouth-feel in the products as well as dietary fiber fortification.

The unique combination of the processing techniques and formulations utilizing oat bran, oat fiber, and water results in a functionality that replaces the high fat levels in meat products and provides comparable organoleptic (texture, mouth-feel and juicy properties) for these newly developed low fat products.

The above attributes are achieved by the unique combination of ingredient quantities in time and temperature of processing that maximize the availability of the cold water soluble gums, primarily beta-glucans from the oat bran and oat fiber.

It has also been discovered that since the fat fraction contains a large portion of the flavor compounds, it is desirable to add concentrated meat flavor to retain good meat flavor in the reduced fat products.

OBJECTS OF INVENTION

In view of the above, it is an object of the present invention to provide low fat meat products and the method of preparing the same.

Another object of the present invention is to provide low fat meat products utilizing less than 5% by dry weight oat bran to produce a product having the mouth-feel, texture and juiciness of regular meat products.

Another object of the present invention is to provide low fat meat products utilizing oat bran in an amount between 0.5 and 5.0% and usually oat fiber up to 3.0% to produce a product that has mouth-feel, texture and juiciness similar to regular meat products.

Other objects and advantages of the present invention will become apparent and obvious from a study of the following description.

DETAILED DESCRIPTION OF INVENTION

To produce the low fat meat product of the present invention, between 0.5 and 5.0% oat bran, between 0 and 3% oat fiber are used adding between 0 and 10% water. A concentrated meat flavor between 0.3 and 3.0% can also be used.

By way of example, the process for producing a low fat ground beef product is as follows: Trim beef to approximately 11% fat by weight and cool to 40 degrees Fahrenheit. Grind or chop to ⅜ inch particle sizes and refrigerate.

Prepare the oat bran, possible oat fiber, and beef flavoring by rehydrating with water for 10 minutes. Alternately, the oat bran with other ingredients may be added in a dry form during mixing of the meat.

Mix ground beef for approximately one minute and add rehydrated mixture (or dry oat bran if using this option). Continue mixing for approximately two minutes and then grind or comminute mixture to ⅛ inch particle size. Package and ship as desired.

| Low Fat Ground Beef Formula | |
|---|---|
| Lean Beef (less than 11% fat) | 79.0–99.2% |
| Oat Bran | 0.5–5.0% |
| Oat Fiber | 0.0–3.0% |
| Water | 0.0–10.0% |
| Beef Flavoring (dry) | 0.3–3.0% |

Batch Example for Producing Low Fat Ground Beef

1. Coarsely grind 877 pounds of beef through grinder plate with ⅜ inch holes or chop to size roughly equivalent to particle size from ⅜ inch grinder plate.
2. Rehydrate 43 pounds of dry ingredients with 80 pounds of water. Allow dry ingredients to rehydrate for 10 minutes.
3. Add rehydrated ingredients to the course ground or chopped meat.
4. In a large blender, mix for approximately two minutes to disperse.
5. Finally, grind the product through a grinder plate with ⅛ inch holes.
6. Form into patties or loosely pack into retail meat trays for shipment.

By way of example, to produce a low fat ground pork product in accordance with the present invention, between 0.5 and 5.0% oat bran, between 0.0 and 3% oat fiber are used adding between 0.0 and 15% water and between 2 and 3% flavoring.

The process for producing the low fat pork product is as follows: Trim the pork to approximately 11% fat or less (either hot boned or pre-chilled) and then cool to 40 degrees Fahrenheit. Grind the meat to ⅜ inch and refrigerate while rehydrating the mixture of oat bran and flavoring with water for approximately 10 minutes. Mix the ground pork for 15 seconds and then add rehydrated mix and continue to mix for 30 seconds. As with the beef product, the oat bran can be added directly in a dry form by dusting into the meat during the mixing process to modify the final product texture. Finally, grind or comminute to 3/16 inch particle size, package and ship.

Batch Example for Producing Low Fat Ground Pork

1. Coarsely grind 850 pounds of pork through grinder plate with ⅜ inch holes or chop to size roughly equivalent to particle size from ⅜ inch grinder plate.
2. Rehydrate 40 pounds of oat bran/oat fiber dry mixture with 90 pounds of water. Allow ingredients to rehydrate for two to ten minutes.
3. Add rehydrated ingredients to the coarse ground or chopped meat. Then add 20 pounds of flavoring.
4. Mix for approximately one minute to disperse the rehydrated ingredients within the meat matrix.
5. Finally, grind through a grinder plate with 3/16 inch holes 6. Form into patties, retail one pound "chubs", or stuff into casings for link sausage and ship.

All percentages given for the meat products of the present invention are by weight.

Although specific examples have been given for ground type beef and pork products, it is to be understood that oat bran at the same level can be applied to other low fat meat products as a fat replacer to produce low fat meat products that have the mouth-feel, juiciness and tenderness of normal fat meat products.

The present invention may, of course, be carried out in other specific ways than those herein set forth without departing from the spirit and essential characteristics of the invention. The present embodiments are, therefore, to be considered in all respects as illustrative not restrictive, and all changes coming within the meaning and equivalency range of the appended claims are intended to be embraced therein.

What is claimed is:

1. The process of producing a low fat ground beef meat product comprising: trimming the meat to no more than 11%, by weight, fat; cooling said meat to approximately 40 degrees Fahrenheit; comminuting the meat to approximately ⅜ inch particle size; mixing between 0.5 and 5.0%, by weight, oat bran and between 0.3 and 3.0% by weight beef flavoring with the comminuted meat; and comminuting said mixture to approximately ⅛ inch particle size whereby a low fat meat product is provided that when cooked, has the mouth-feel, texture, juiciness and tenderness of normal fat comminuted meat products.

2. The process of claim 1 wherein up to 3.0%, by weight, oat fiber is added to the mixture.

3. The process of claim 1 wherein the oat bran and beef flavoring are rehydrated with up to 10.0%, by weight, water prior to mixing with the comminuted meat.

4. The process of claim 3 wherein up to 3.0%, by weight, oat fiber is added to the oat bran and beef flavoring prior to rehydration.

5. The process of claim 3 wherein the comminuted meat is mixed for approximately one minute prior to adding the rehydrated oat bran and beef flavoring with mixing continuing for approximately two minutes prior to being comminuted to approximately ⅛ inch particle size.

6. The process of claim 1 wherein the comminuted meat is mixed for approximately one minute prior to adding the oat bran and the beef flavoring with the mixing continuing for approximately two minutes prior to being comminuted to approximately ⅛ inch particle size.

7. The process of producing a low fat ground pork meat product comprising: trimming the meat to no more than 11%, by weight, of fat; cooling said meat to approximately 40 degrees Fahrenheit; comminuting the meat to approximately ⅜ inch particle size; mixing between 0.5 and 5.0%, by weight, oat bran and between 2.0 and 3.0%, by weight, pork flavoring with the comminuted meat; and comminuting said mixture to approximately 3/16 inch particle size whereby a low fat meat product is provided that when cooked, has the mouth-feel, texture, juiciness and tenderness of normal fat comminuted meat products.

8. The process of claim 7 wherein up to 3.0%, by weight, oat fiber is added to the mixture.

9. The process of claim 7 wherein the oat bran and the flavoring are rehydrated with up to 15.0%, by weight, water prior to mixing with the comminuted meat.

10. The process of claim 9 wherein up to 3.0%, by weight, oat fiber is added to the oat bran and the flavoring prior to rehydration.

11. The process of claim 9 wherein the comminuted meat is mixed for approximately 15 seconds prior to adding the rehydrated oat bran and flavoring with mixing continuing for approximately 30 seconds prior to being comminuted to approximately 3/16 inch particle size.

12. The process of claim 7 wherein the comminuted meat is mixed for approximately 15 seconds prior to adding the oat bran and flavoring with mixing continuing for approximately 30 seconds prior to being comminuted to approximately 3/16 inch particle size.

* * * * *